May 28, 1935.  N. D. LEVIN  2,002,952

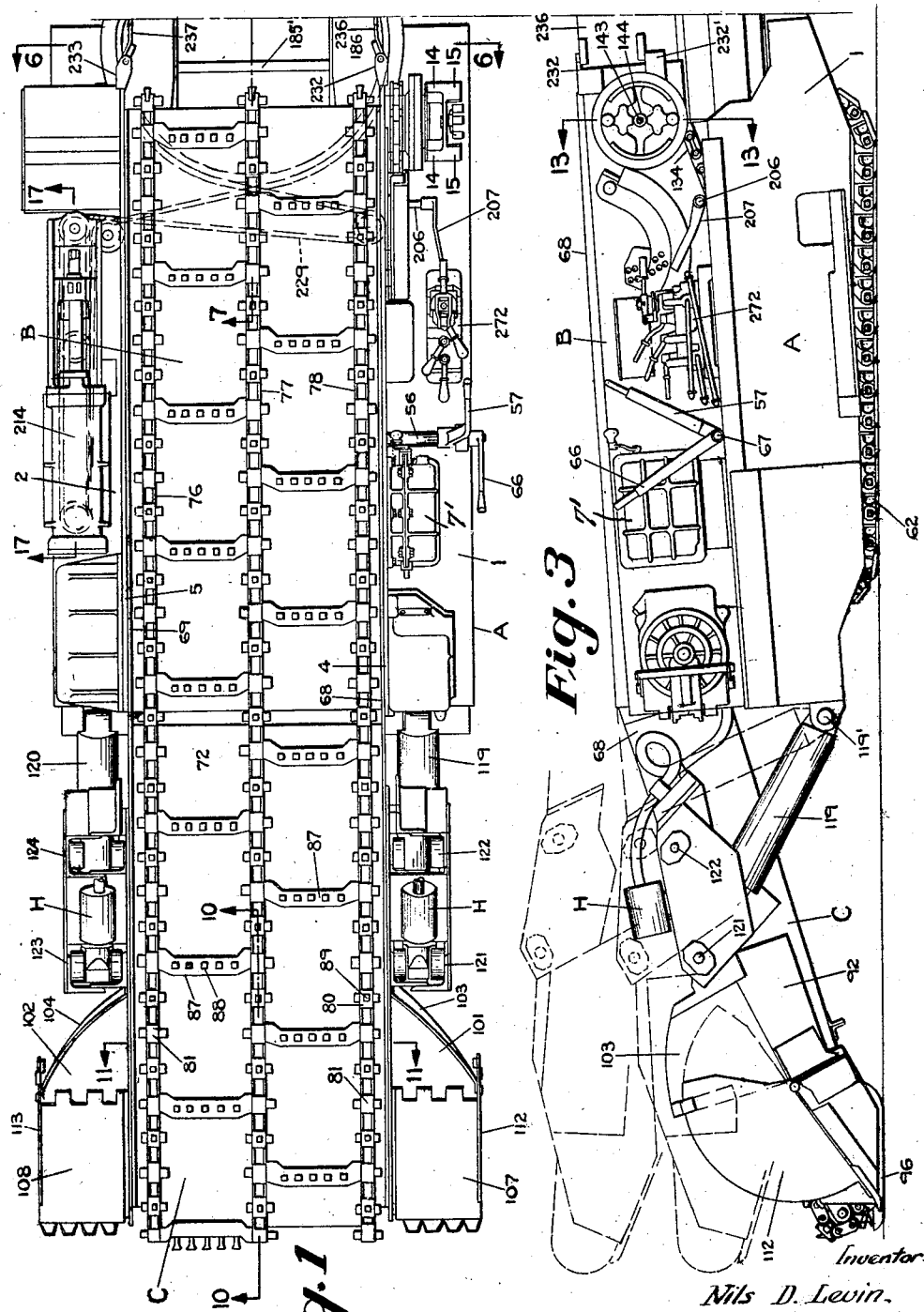

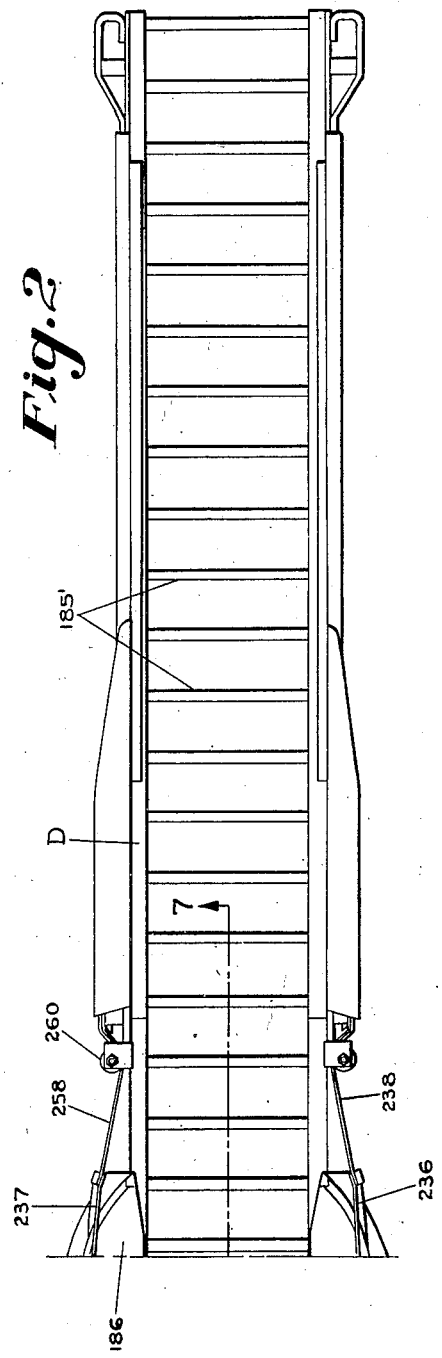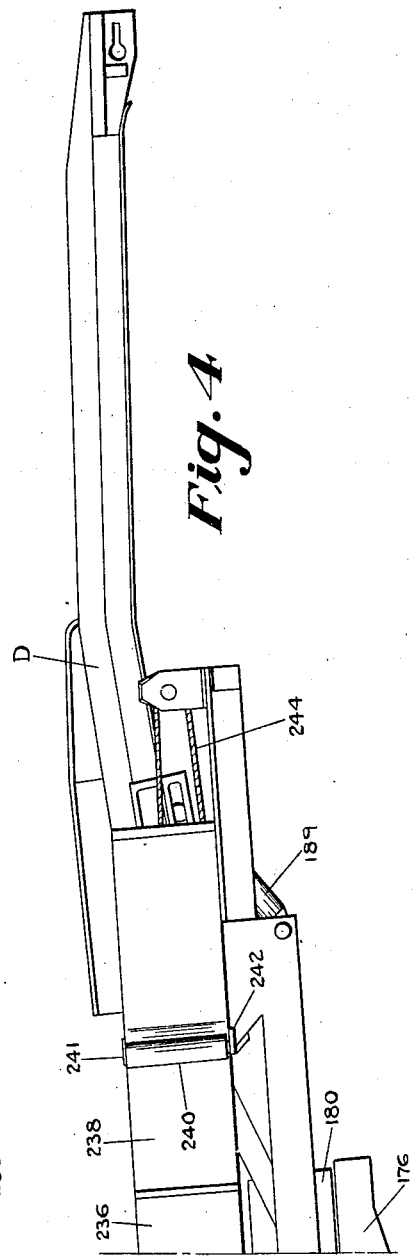

MATERIAL HANDLING MECHANISM

Original Filed May 8, 1930  11 Sheets-Sheet 4

Inventor.
Nils D. Levin.
By Cushman, Rupert Daily
Attorneys

May 28, 1935.   N. D. LEVIN   2,002,952
MATERIAL HANDLING MECHANISM
Original Filed May 8, 1930   11 Sheets-Sheet 5
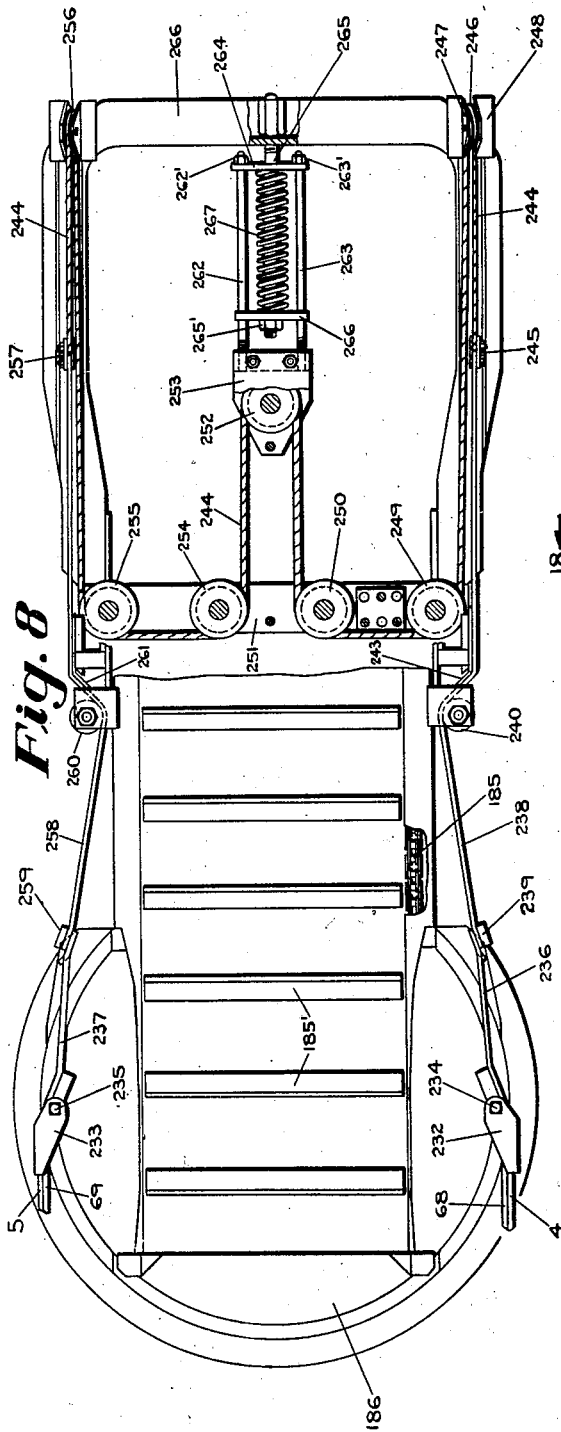
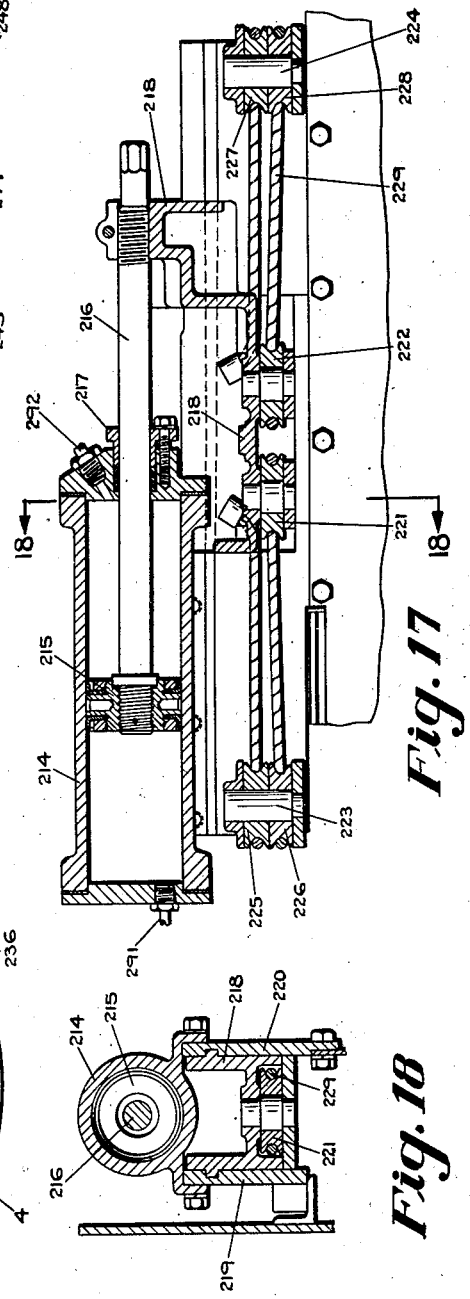
Inventor
Nils D. Levin.
Attorneys May 28, 1935. N. D. LEVIN 2,002,952

MATERIAL HANDLING MECHANISM

Original Filed May 8, 1930    11 Sheets-Sheet 6

Inventor
Nils D. Levin
By Cushman, Dupont, Daly
Attorneys

May 28, 1935.  N. D. LEVIN  2,002,952
MATERIAL HANDLING MECHANISM
Original Filed May 8, 1930   11 Sheets-Sheet 7

Inventor
Nils D. Levin
Attorneys

May 28, 1935.  N. D. LEVIN  2,002,952
MATERIAL HANDLING MECHANISM
Original Filed May 8, 1930  11 Sheets-Sheet 8

Inventor.
Nils D. Levin.

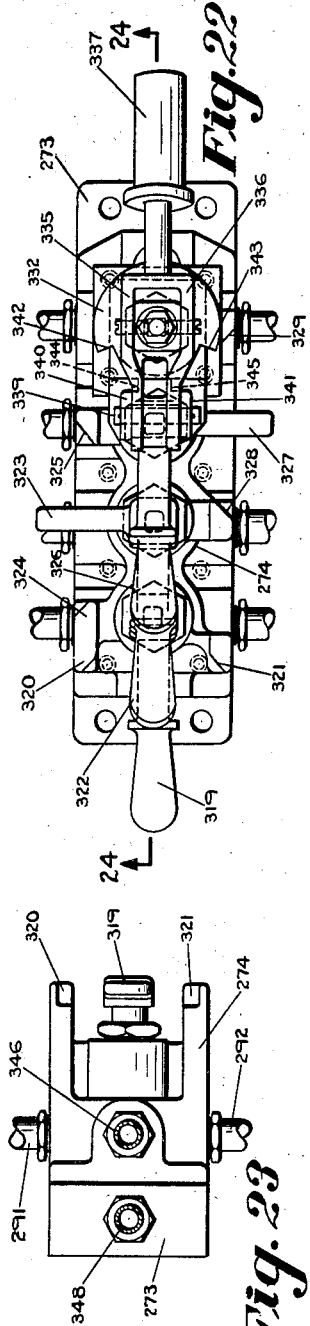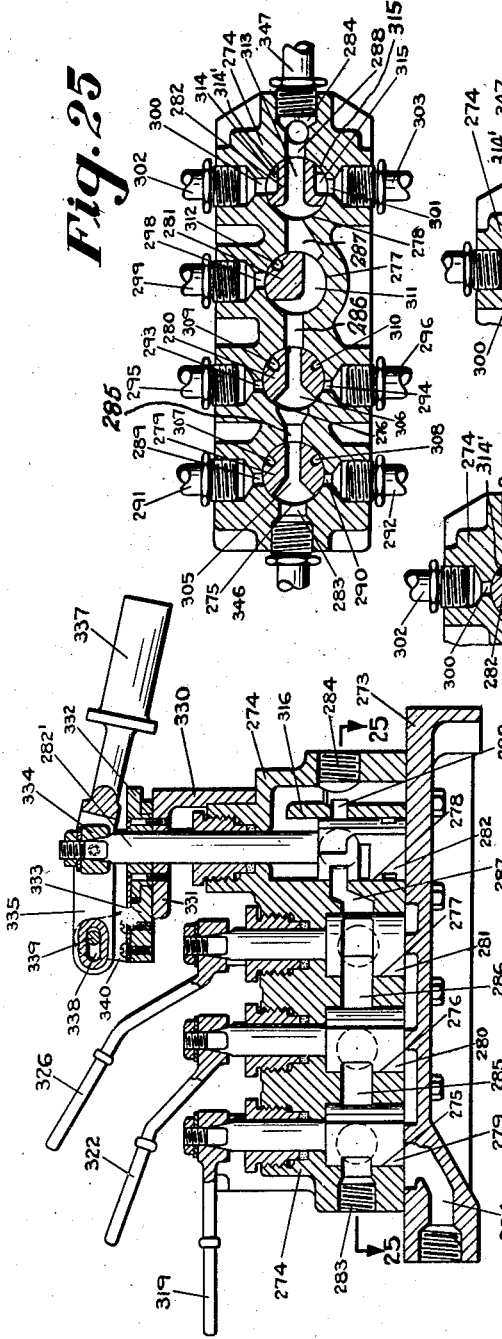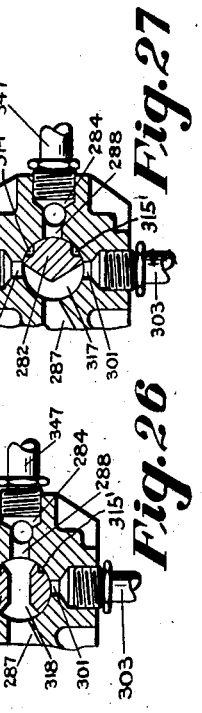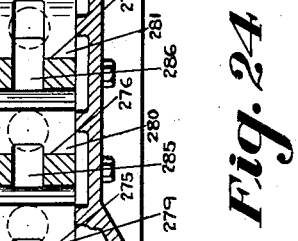

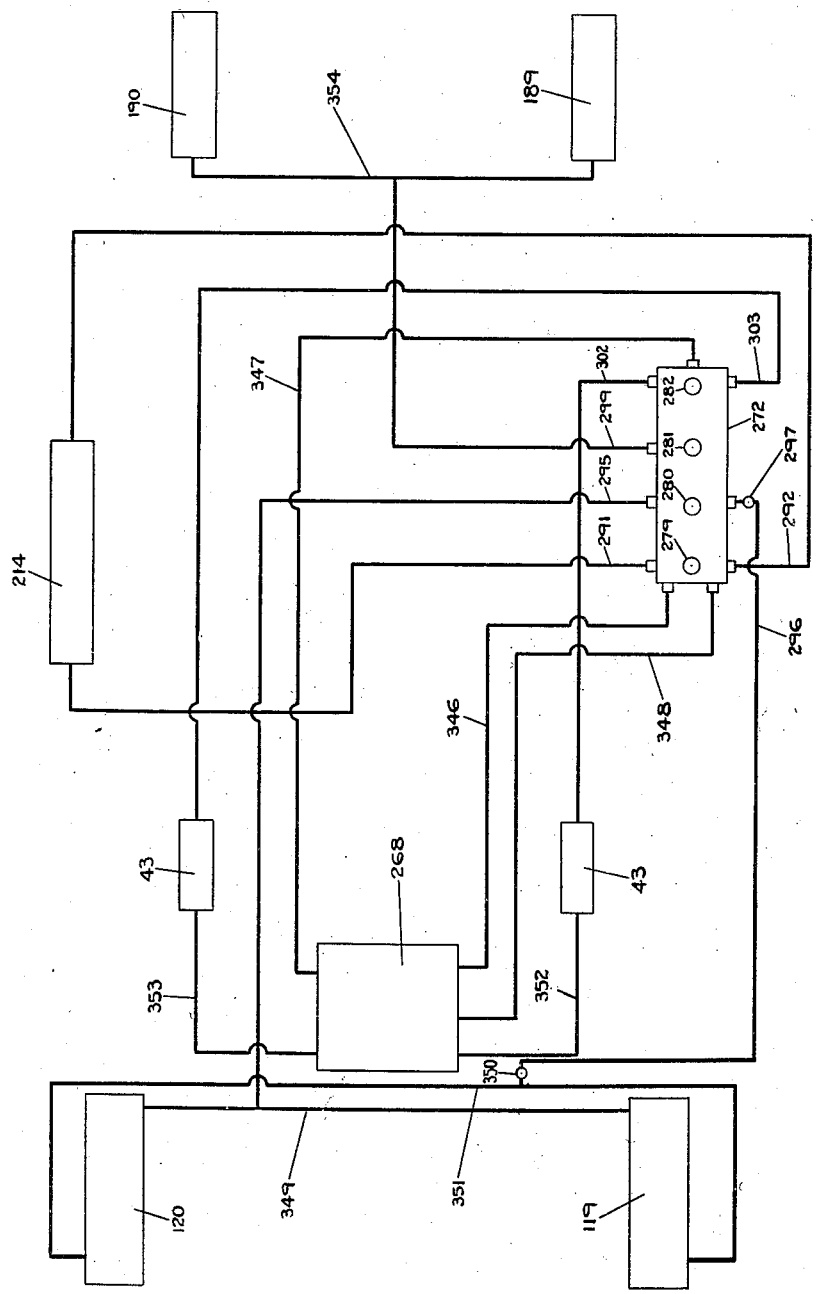

Patented May 28, 1935

2,002,952

UNITED STATES PATENT OFFICE 2,002,952

MATERIAL HANDLING MECHANISM

Nils D. Levin, Columbus, Ohio, assignor to The Jeffrey Manufacturing Company, a corporation of Ohio Continuation of application Serial No. 450,742, May 8, 1930. This application July 26, 1933, Serial No. 682,348

8 Claims. (Cl. 198—7)

The present invention relates to a loading machine of a type particularly adapted for use in coal mines for gathering disrupted material and conveying it upwardly and away from the coal face to deposit it, for example, in a receptacle such as a mine car, for removal from the mine.

The machine comprises essentially a chassis maneuverable over a mine floor and supporting a conveyor which includes a gathering portion oscillable in vertical planes, a substantially horizontal portion forming a continuation of the gathering portion, and a delivery portion oscillable in both vertical and horizontal planes and so positioned as to receive from the horizontal portion.

This application is a continuation of Ser. No. 450,742, filed May 8, 1930.

According to the embodiment of the invention to be described hereinafter, the chassis is of relatively short length and includes endless treads with differential drive connections. The gathering and delivery portions of the conveyor train project considerably beyond the chassis, the intermediate portion of the conveyor train being set in a channel between housings for the endless treads. Inasmuch as the component parts of the machine are of considerable weight, hydraulic means are preferably provided for effecting the various oscillatory adjustments of the conveyor sections and for controlling the differential drive to the endless tread devices.

Beyond the general features briefly mentioned above, the invention includes improvements in various details of construction and the purposes and novel mechanisms contemplated in the invention as a whole will be understood from the description of a specific embodiment of the invention which follows. The description is made with reference to the accompanying drawings in which:

Figures 1 and 2 constitute a plan view of the machine;

Figures 3 and 4 constitute a side elevation of the machine;

Figure 8 is a plan view of the rear conveyor with certain parts broken away to reveal other parts;

Figure 17 is a section on line 17—17 of Figure 1;

Figure 18 is a section on line 18—18 of Figure 17;

Figure 22 is a plan view of a valve control device for the hydraulic medium;

Figure 23 is an end elevation of the device of Figure 22;

Figure 24 is a section on line 24—24 of Figure 22;

Figure 25 is a section on line 25—25 of Figure 24;

Figure 26 is a partial section on line 25—25 of Figure 24 with the parts in a different relative position;

Figure 27 is a partial section on the line 25—25 of Figure 24 with the parts in still another relative pisition; and Figure 28 is a diagrammatic plan of the entire hydraulic system of the machine.

Figure 5:
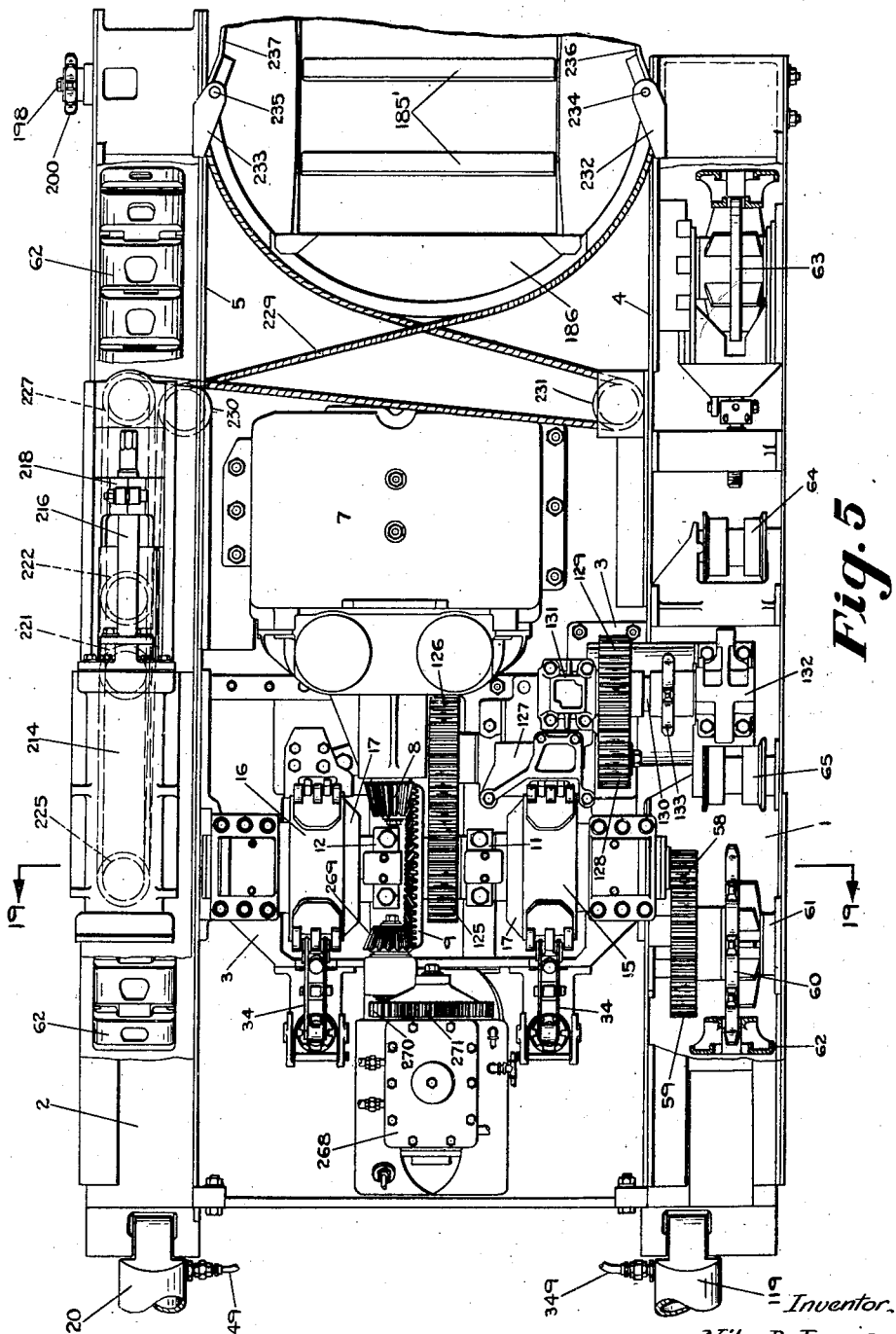
Figure 5 is a plan view of the chassis or tractor unit, with the main conveyor removed and other parts broken away.

Referring now to the drawings, and first of all to Figures 1 to 4, the machine comprises in general a chassis or tractor unit A supporting a main conveyor B having a forwardly projecting horizontally pivoted gathering section C, and a delivery conveyer D. As shown, the chassis includes endless tread devices operable to maneuver the machine over the mine floor and to engage the gathering end C of the main conveyor in a mass of disrupted coal so that the coal will be passed rearwardly to the conveyor D and thence deposited for removal from the mine.

Figure 19:
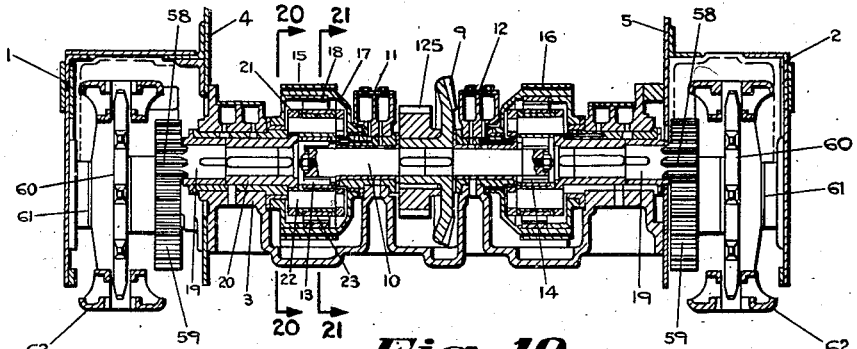
Figure 19 is a section on line 19—19 of Figure 5.

Referring also to Figures 5 and 19, the chassis A includes a pair of box-like parallel side members 1 and 2 interconnected below their upward extremities by means of a substantially horizontal frame casting 3. Parallel plates 4 and 5 secured to the upper, inner margins of members 1 and 2 define a channel adapted to receive the main conveyor frame, as will be hereinafter described. A casting 6, Figure 7, secured between the rear portions of elements 1 and 2 is adapted to support the delivery conveyor D.

A motor 7, Figure 5, is arranged on casting 3 with its armature shaft in parallel relation to elements 1 and 2. An armature pinion 8 engages a bevelled gear 9 keyed to a drive shaft 10, Figure 19, supported in journal bearings 11 and 12 of the main frame casting 3. Fixed to the opposite ends of drive shaft 10 are pinions 13 and 14 constituting the sun gears of planetary trains generally indicated at 15 and 16. The speed and direction of rotation of the motor are controlled by a controller 7' Figures 1 and 3.

Figure 20:
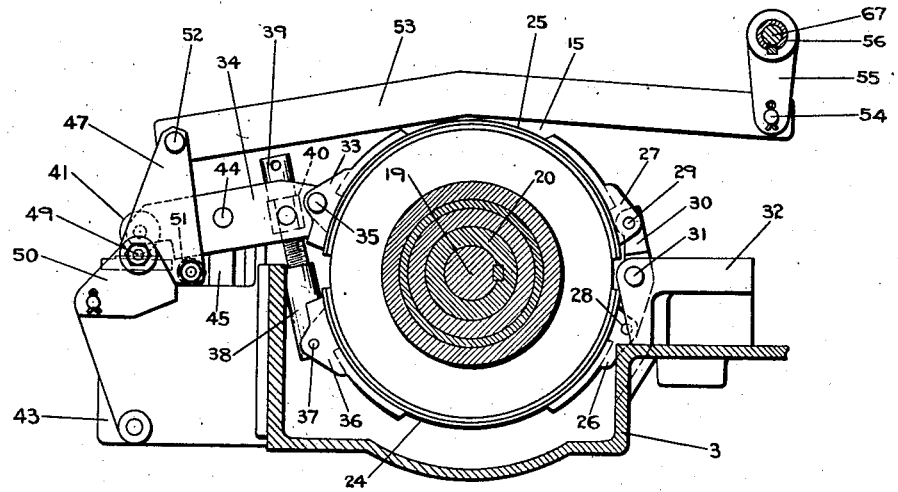
Figure 20 is a section on line 20—20 of Figure 19.

The planetary mechanisms 15 and 16 are identical and unit 15 is shown in detail in Figures 20 and 21 to which reference will now be made, in addition to Figure 19.

A drum 17 is mounted for free rotation on a bushing concentric with main drive shaft 10 and has keyed thereto an internal ring gear 18 journalled on a bushing concentric with a driven shaft 19, which is coaxial with shaft 10. A sleeve 20 keyed to shaft 19 is provided with a radial flange 21 carrying a plurality of stud shafts 22 on which are rotatably mounted pinions 23 meshing with the teeth of pinion 13 and ring gear 18.

Half circle bands 24 and 25 encircle drum 17 and each is provided at one end with a lug 26 or 27 connected by means of pins 28 and 29 to a supporting lug 30 mounted on a pin 31 supported by a casting 32 bolted to the main frame casting 3, this mounting preventing rotation of the bands with the drum. To the other end of band 25 is fixed a lug 33 to which is pivotally connected one end of a lever 34 by means of a pin 35, lever 34 being of twin arm form, as may be most clearly seen in Figure 5, with one arm positioned at each side of lug 33.

To the other end of band 24 is fixed a lug 36 to which is pivoted, by means of a pin 37, a threaded socket member 38 in which is engaged the threaded end of a screw 39, whose other headed end is supported on a yoke 40 pivotally mounted between the arms of lever 34 adjacent pin 35.

A roller 41 is supported between the free ends of lever 34 and rests on the upper plane face of a piston 42 reciprocable in a cylinder 43. To the medial portion of lever 34 is pivotally secured by means of a pin 44, a rod 45 influenced by a compression spring 46 to hold roller 41 against the end of piston 42. It will be obvious from the described linkage that elements 45 and 46 constitute release means for bands 24 and 25, yieldably opposing oscillation of lever 34 due to movement of piston 42 (which engages roller 41) outwardly of cylinder 43 when hydraulic pressure is admitted to the latter.

In case of failure of the hydraulic mechanism, manual means are provided for the tightening of bands 24 and 25. A pair of triangular plates 47 and 48, Figures 20 and 21, are pierced at one pair of their registering apices to receive a bolt 49 extending between a pair of ears, one of which is shown at 50, Figure 20, fixed to the casting in which cylinder 43 is formed. At another pair of their apices, plates 47 and 48 carry a roller 51 engaged under lever 34, while at their remaining pair of apices the plates have pivoted thereto, through a pin 52, a link 53. At its other end, link 53 is connected through a pin 54 with an arm 55 fixed to a hollow rock shaft 56 to the outer end of which, at the control side of the machine is fixed a hand lever 57, Figures 1 and 3. By moving lever 57 to rock shaft 56 in a clock-wise direction, plates 47 and 48 are rocked in a counterclockwise direction to cause the roller 51 to abut behind lever 34 and swing the latter so that the brake bands are tensioned. It will be noted that piston 42 and roller 41 are merely in abutting engagement with lever 34 so that actuation of one of them leaves the other entirely unaffected.

Figure 21:
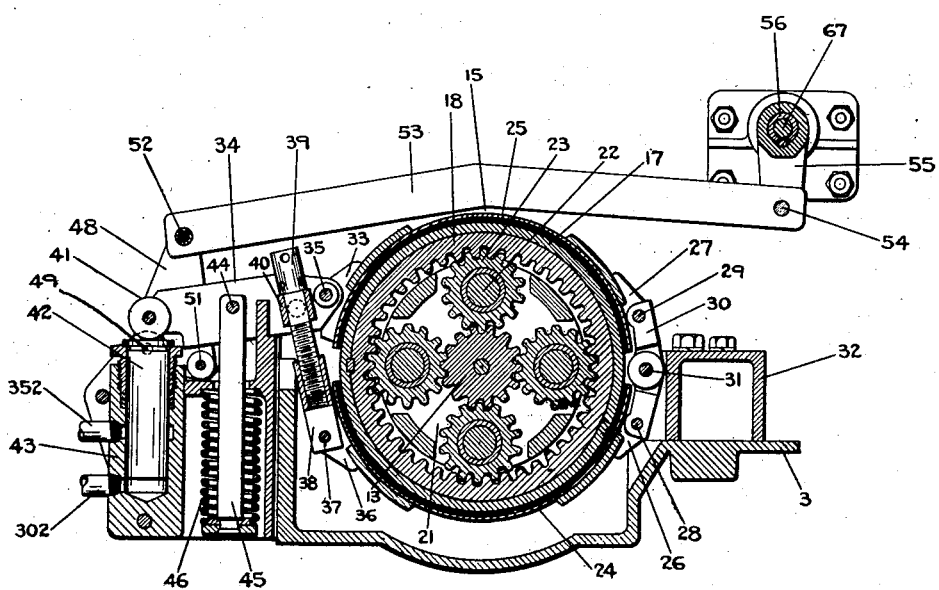
Figure 21 is a section on line 21—21 of Figure 19.

In Figures 1 and 3, a lever 66 is shown fixed to a rock shaft 67 having rigidly secured thereto an arm similar to arm 55 of Figure 21 connected with means to effect the manual operation of the bands associated with planetary gearing 16, shaft 67 being disposed within hollow shaft 56. It will be understood that gearing 16 is provided with hydraulic operating means indentical with those described with reference to gearing 15.

Shaft 19, Figure 19, has cut in its outer end the teeth of a pinion meshing with a spur gear 59 fixed to the hub of a sprocket 60 which is mounted on a stud shaft 61 fixed to the outer wall of member 1, the sprocket engaging an endless tractor chain 62 to drive the latter. From Figure 5 it will be seen that left hand chain 62 is adapted to be trained over an idler sprocket 63, the lower run of the chain being supported on rollers 64 and 65. As a matter of convenience, the sprocket drive elements at each side of shaft 10 have been given the same reference numerals in Figure 19.

From the above description it will be seen that I have provided a chassis specifically in the form of an endless tread tractor maneuverable in any direction through the proper manipulation of the manual or hydraulic control means. It will be understood that with the bands of both drums loose, there will be no transmission of power from the motor to the treads. Upon equal application of restraining force to the two drums, the tractor will move forward in a straight line, while differential application of pressure will cause the tractor to turn in the desired direction and at the desired angle.

Figure 11:
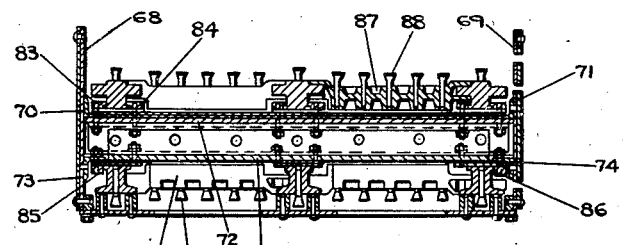
Figure 11 is a section on line 11—11 of Figure 1.

As may be seen from the cross sectional view of Figure 11, the main conveyor B, C comprises a frame composed of side plates 68 and 69 to which are secured the vertical webs of angle-bars 70 and 71 respectively. The horizontal webs of the angle-bars have secured thereto a bottom plate 72. Angle-bars 73 and 74 in parallel relation to and below bars 70 and 71 have vertical webs secured to plates 68 and 69 respectively, while a plate 75 is secured to their horizontal webs.

Figure 9:
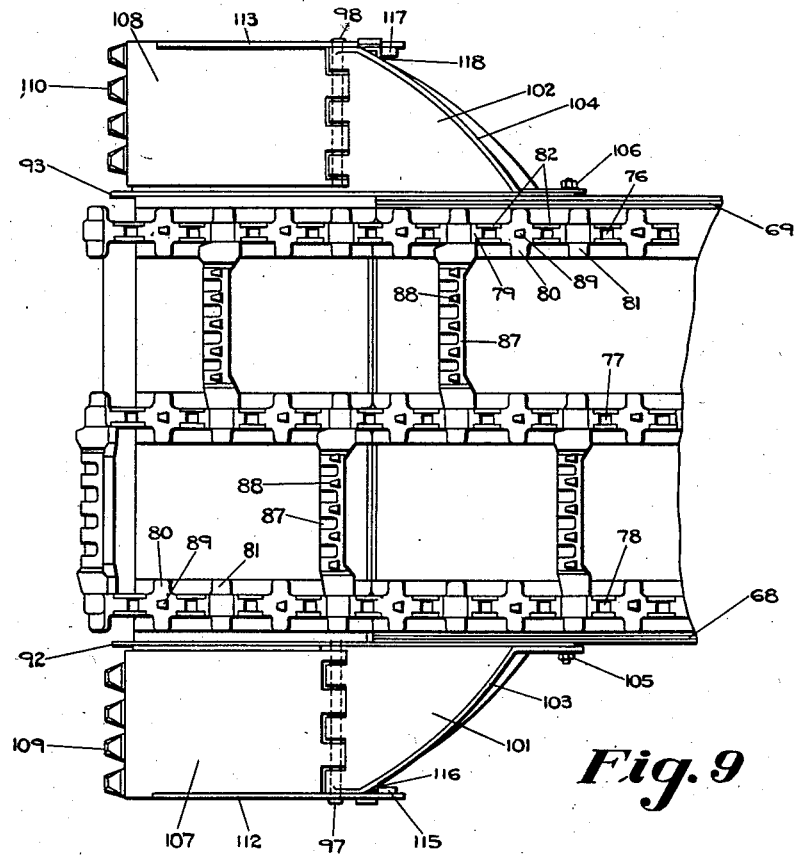
Figure 9 is an enlarged plan view of the gathering end of the main conveyor.
Figure 10:
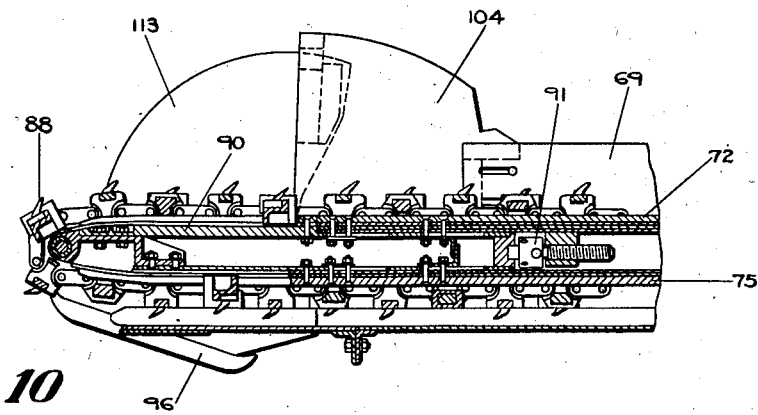
Figure 10 is a section on line 10—10 of Figure 1.

The conveyor chain comprises three flexible strands 76, 77 and 78, each made up of blocks as at 79, 80 and 81 connected by links 82, Figure 9. The blocks have lower portions in the form of an inverted T, the flanges of which engage under the flanges of guide rails 83 and 84 secured to the top of plate 72, similar guide rails 85 and 86 being secured to the bottom of plate 75.

Blocks 79 and adjacent chains support between them flights 87 having set therein cutter bits 88. Blocks 80 are provided with sockets for the reception of cutter bits 89, while blocks 81 merely serve the purpose of guide members in their co-operation with strips 83 and 84.

Section B of the main conveyor is adapted to be received in the channel defined by plates 4 and 5 and casting 3. The projecting portion C of the main conveyor is pivoted to the portion B, on a horizontal axis, the pivot point being hidden in Figure 3 by box-frame 1, but the point of articulation being generally indicated in Figure 1 by an overlap in the bottom plate 72 and in Figure 3 by an overlap of the side plate 68. The articulation of the main conveyor enables its gathering end to be let down into contact with the mine floor, or to be swung relative to the portion B until the edges of plate 68 at the point of articulation come into contact when the two conveyor portions are in substantial alignment as in the lower dotted line position of Figure 3. If further lifting effort is exerted on portion C, the main conveyor as a whole may be swung about a pivot point at the rear of the chassis to the uppermost dotted line position of Figure 3.

Figure 12:
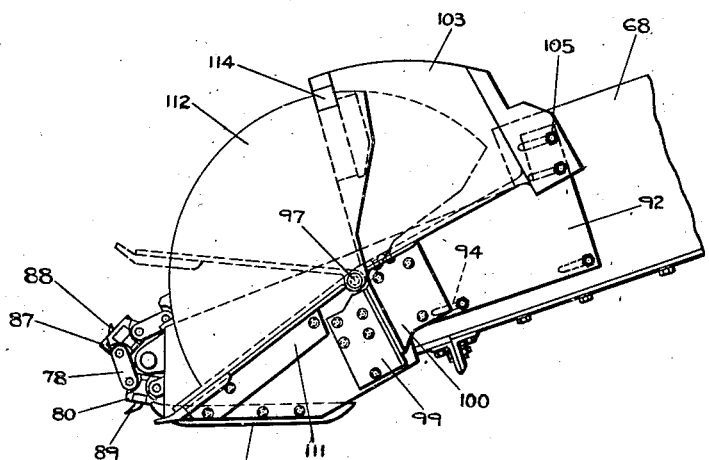
Figure 12 is an enlarged side elevation of the gathering end of the main conveyor.

Plates 72 and 75 of the conveyor frame terminate forwardly in an extension frame generally indicated at 90, which through screw 91 may be longitudinally adjusted relative to plates 72 and 75 to obtain proper tension of the conveyor chains. A pair of side plates 92 and 93 are secured to the extension frame 90 and have a bolt and slot connection with side plates 68 and 69 as indicated at 94, Figure 12. The side or guard plates 92 and 93 are thus adapted to participate in the adjustment of extension frame 90. These plates support between them a shoe 95 adapted to rest on the mine floor and take the weight of the forward end of the conveyor. Pins 97 and 98, Figures 3, 9 and 12, project laterally of plates 92 and 93, and are supported at their inner ends by means of bracket plates as indicated at 99, 100, Figure 12. Pins 97 and 98 support the forward knuckled extremities of plates 101 and 102 which slope upwardly to the top of plates 92 and 93, the outer edges of plates 101 and 102 converging rearwardly to the conveyor. Along their margins extend guard plates 103 and 104 secured at their rear extremities to the side walls of the conveyor by means of bolts 105 and 106.

Pins 97 also support forwardly and downwardly extending shovel or scoop portions 107 and 108 by means of knuckled extremities inter-engaged with the knuckled extremities of portions 101 and 102. The forward edges of plates 107 and 108 are provided with digging teeth 109 and 110 which are prevented from falling below the level of shoe 95 by means of stop brackets as shown at 111, Figure 12. The outer margins of plates 107 and 108 have mounted thereon guard plates 112 and 113 overlapping the forward edges of plates 101 and 102 and guided in yoke-shaped brackets of the latter as at 114, Figure 12. At its rear extremity, plate 112 is provided with an abutment lug 115 adapted to cooperate with an abutment lug 116 of plate 103 to limit the downward movement of the plate in conjunction with bracket 111, the plate, however, being adapted to swing freely upward to the position shown in dotted lines in Figure 12. Plates 113 and 104 are provided with similar abutment lugs 117 and 118.

From the above description it will be evident that when the gathering end of the conveyor is engaged in a mass of material, the cutter bits will act to disrupt it, if this is necessary, and drag it onto the conveyor. At the same time, the lateral scoops engage loose material and guide it by means of the oblique plates 103 and 104 to the conveyor trough. The pivotal mounting of the forward ends of the scoops enables them to work into and suitably adjust themselves to the material to be loaded. Headlights H are provided at the sides of conveyor section C in position to illuminate the material to be gathered.

As has been mentioned, hydraulically actuated means are provided for effecting the angular adjustments of conveyor section C. Referring to Figures 1 and 3, it will be noted that at the left of the machine to the outside of conveyor section C a hydraulic jack or cylinder and piston unit 119 is pivoted to side frame element 1 of the tractor about a pin 119' and a similarly mounted unit 120 is provided at the right of the conveyor. The projecting end of unit 119 may be connected to conveyor C at a point 121 or at a rearwardly spaced point 122 and unit 120 has similar attachment points 123 and 124. If section C is merely to be swung relative to section B, to the lower dotted line position, Figure 3, units 119 and 120 will ordinarily be connected at points 121 and 123, thus securing greater leverage. If the conveyor as a whole is to be swung, however, section C will be blocked in its lower dotted line position and the ends of units 119 and 120 transferred to connection points 122 and 124. Upon further expansion of the units, the forward end of the conveyor may be moved to the upper dotted line position of Figure 3.

Referring to Figures 5 and 19, a spur gear 125 is keyed on the hub of bevel gear 9 and meshes with a spur gear 126 which is fixed to a shaft (not shown) journalled in a bearing 127 and having secured to its other end a pinion 128. Pinion 128 meshes with a spur gear 129 fixed on a shaft 130 journalled in bearings 131 and 132. A sprocket 133 is fixed to shaft 130 to be driven through the train just described. Engaged with sprocket 133 is a sprocket chain 134, Figure 13, engaged by a sprocket 135 concentric with the head shaft 136 of the main conveyor.

Figure 13:
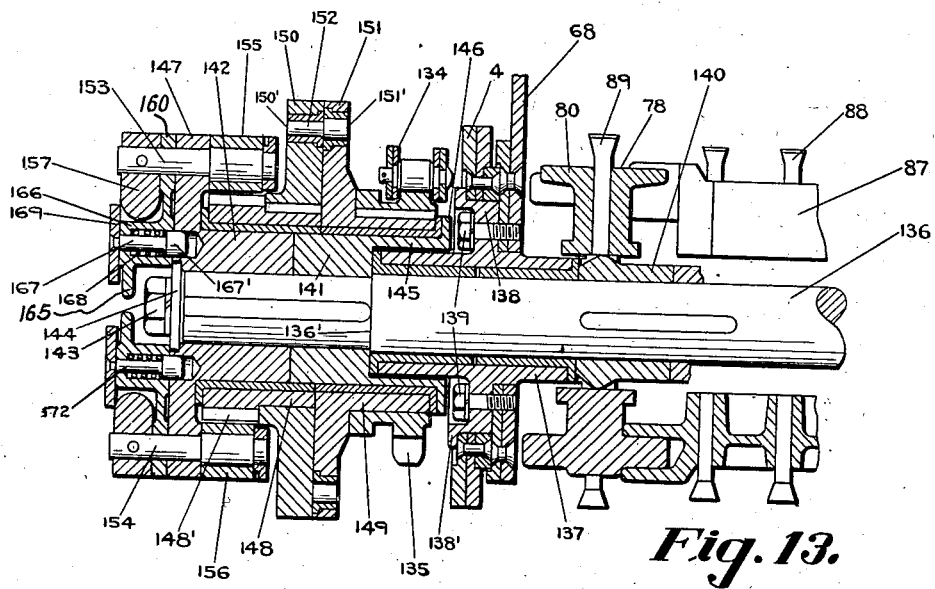
Figure 13 is a section on line 13—13 of Figure 3.

Head shaft 136, Figure 13, is journalled at its left end in a bearing 137 passing through an aperture in the side wall 68 of the conveyor frame and having a circular flange 138 secured to the aperture margins by means of cap screws 139. Flange 138 is journalled in an aperture in extension plate 4 of the chassis frame and is retained therein by means of a radially expanded portion 138'. The other end of head shaft 136 is journalled in a similar manner and it is about this shaft as an axis that the conveyor frame B, C as a whole, is adapted to be oscillated in the manner hereinbefore described. As indicated in Figure 13, a sprocket 140 keyed on shaft 136 engages chain 78 and similar sprockets engage chains 76 and 77.

A pair of sleeves 141 and 142 are keyed on shaft 136 and restrained against longitudinal displacement relative thereto by means of a shoulder 136' and a cap screw and washer 143 and 144. Sleeve 141 has a longitudinal extension 145 embracing the outer extremity of bearing 137 and is provided at its extremity with a radial flange 146. Sleeve 142 is provided at its outer extremity with a radial flange 147. A pair of sleeves 148 and 149 are rotatable on sleeves 141 and 142 between flanges 146 and 147 and have integral therewith or fixed thereto contacting radial flanges 150 and 151 provided with apertures 150' and 151' in which a shear pin 152 is adapted to be engaged. Sprocket 135 is fixed on sleeve 149 so that its rotation is imparted to the latter and thence through the shear pin to sleeve 148. Sleeve 148 has formed therein a number of ratchet teeth 148' as may be most clearly seen in Figure 14.

A pair of pins 153 and 154 have shanks journalled in flange 147 and enlarged portions to which are keyed double ended pawls 155 and 156 adapted to cooperate with teeth 148'. To the outer end of pin 153 is secured an arm 157 having formed therein a pair of opposed sockets 158 and 159, Figure 15. Interposed between arm 157 and flange 147 is a plate 160 swingable about pin 153 and having laterally opposed extensions 161 and 162 conformed as pockets to receive compression springs 163 and 164, the other ends of which are received in sockets 158 and 159 respectively. Plate 160 has an extension 165 provided with a boss 166 in which is slidable a pin 167 surrounded by a compression spring 168 engaging behind a head 167' of the pin. The other end of the pin has secured thereto a lift button 169.

Head 167' of pin 167 is adapted to cooperate with a plurality of recesses arranged on an arc concentric with pin 153 to retain the latter and therewith pawl 155 in a selected position. Of these recesses, only two are visible in Figure 15, these being designated by the reference numerals 170 and 171. Recess 170 defines the neutral position of the pawl wherein neither of its ends engage teeth 148', while by disposing head 167' in recess 171 or in another recess, hidden in the position of parts shown in Figure 15, either end of the pawl 155 may be engaged with teeth 148' so that the pawl supporting flange 147 may be made to rotate through the pawl and ratchet engagement in either direction of rotation of the ratchet, it being understood that motor 7 is reversible. Springs 163 and 164 enable the pawl to pass over teeth 148' if the direction of rotation of sprocket 135 is reversed without readjustment of the pawl. For example, in Figure 14, flange 147 will be driven only when sleeve 148 is rotated in a clockwise direction.

Figures 14, 15:
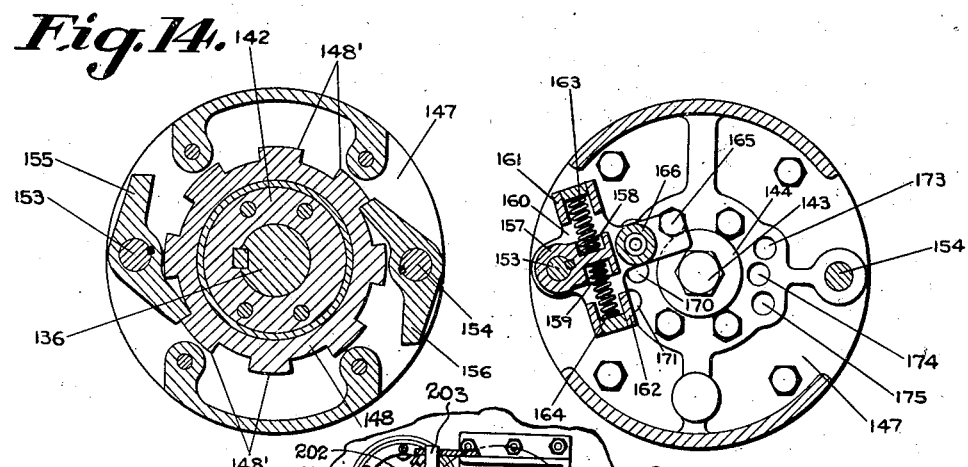
Figure 14 is a section on line 14—14 of Figure 1.
Figure 15 is a section on line 15—15 of Figure 1.

Pawl 156 is provided with the same adjusting mechanism as has just been described in connection with pawl 155, and the three locking recesses for its associated pin 172 are indicated at 173, 174 and 175, Figure 15.

From the description thus far, it will be clear that due to the positive clutch arrangement constituted by the double actuating pawl and ratchet mechanism, the chassis may be driven in either direction with the drive connection to head shaft 136 entirely interrupted or the clutch may be so adjusted that the head shaft will be driven when the chassis is being maneuvered in a forward direction but not when it is moving rearwardly. On the other hand, the clutch mechanism may be so adjusted that the head shaft may be reversely rotated to exert reverse tension on the conveyor chains in case of necessity. Inasmuch as the delivery conveyor D takes its drive from head shaft 136, it will be evident that the same possibilities of operation exist as regards that conveyor.

Figure 6:
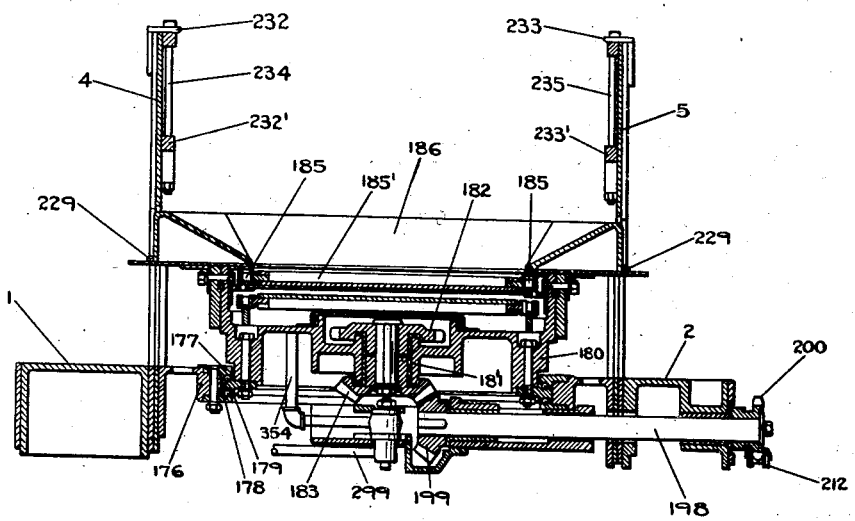
Figure 6 is a section through the vertical pivot of the rear or delivery conveyor, and is taken along the line 6—6 of Figure 1.
Figure 7:
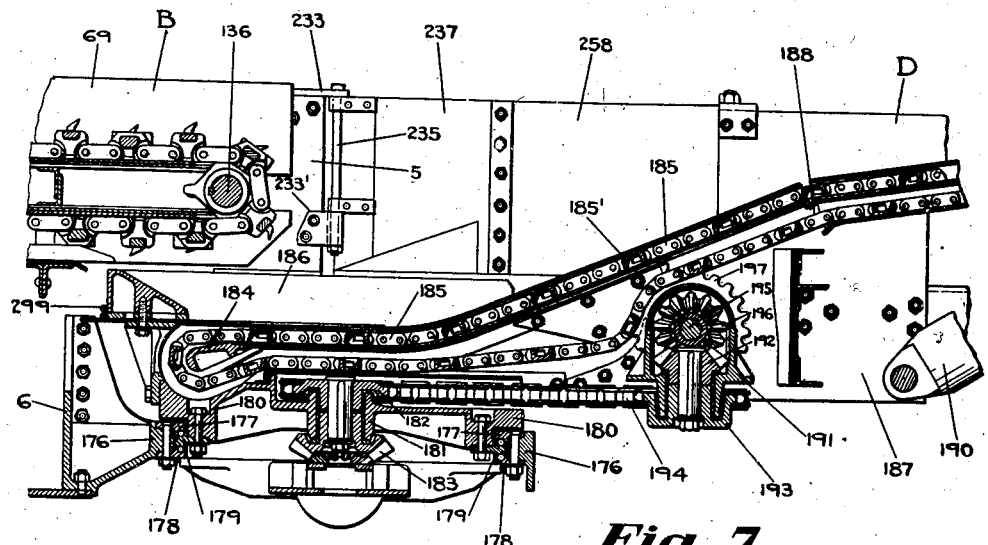
Figure 7 is a section on the line 7—7 of Figures 1 and 2.

Referring to Figures 6 and 7, casting 6 has formed integral therewith a ring 176 having secured thereto inwardly projecting rings 177 and 178 constituting upper and lower ball races of a step bearing including an intermediate ring 179. Ring 179 has secured thereto a casting 180 provided with a central bearing 181 in which are journalled the hubs of a sprocket 182 and a bevel gear 183 keyed on a common shaft. Casting 180 supports a foot guide 184 for the chains 185 of conveyor D, a hopper 186 positioned immediately below the delivery end of conveyor B, and a conveyor supporting frame 187, Figure 7. The trough of conveyor D is articulated at 188 and the rearwardly projecting end is adapted to be oscillated by means of a pair of jacks 189 and 190, Figure 28, only one of which is visible in Figure 7.

In a vertical bearing 191, supported by the frame 187 are journalled the hubs of a bevel pinion 192 and a sprocket 193, which are keyed on a common shaft, the sprocket being connected with sprocket 182 by means of a chain 194. A suitably journalled shaft 195 has keyed thereon a bevel pinion 196 meshing with pinion 192. Fixed on shaft 195 are sprockets 197 engaging the lower runs of conveyor chains 185 to drive the latter.

Journalled in suitable bearings supported from casting 6 is a shaft 198 parallel to head shaft 136. At its one end, shaft 198 has keyed thereto a bevel gear 199 meshing with bevel gear 183, Figure 6, and to its outwardly projecting end is secured a sprocket 200.

It will thus be evident that through the described connections, shaft 195 may be driven from shaft 198 in all angular positions of the conveyor D relative to its swinging axis as defined by ring 176 inasmuch as bearing 181 is concentric with this ring. The conveyor chains 185 are connected by means of flights 185' and suitable trough and guide means are provided. Since these means may take any preferred form, however, it is thought that specific description is not here required.

Figure 16:
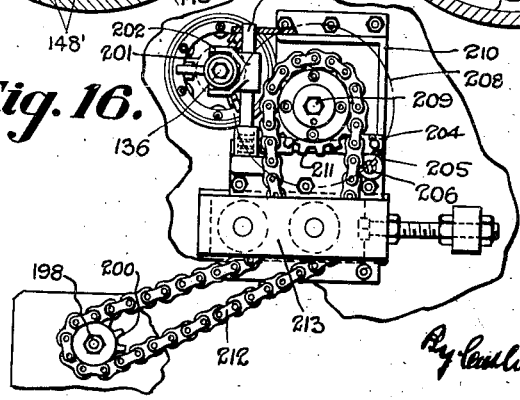
Figure 16 is a side elevation of the rear conveyor drive mechanism.

At its opposite end from sprocket 135, shaft 136 has freely revoluble thereon a pinion 201, Figure 16, adapted to be connected to the shaft by means of a clutch thrown into and out of operation by means of a yoke 202 fixed to a rock shaft 203. To the lower end of shaft 203 is fixed a lever arm connected by means of a link 204 to an arm 205 fixed to a rock shaft 206 which has fixed to its opposite end at the control side of the machine an operating handle 207, Figures 1 and 3. The pinion 201 meshes with a spur gear 208 journalled on a stud shaft supported on a bracket plate 210 secured to the chassis frame. A sprocket wheel 211 fixed to gear 208 is connected by means of a sprocket chain 212 through a tensioning device 213 with sprocket 200.

Shaft 198 associated with the delivery conveyor D may thus be driven only when head shaft 136 of the main conveyor is driven. By means of the clutch arrangement, however, the delivery conveyor need not be driven at all times during the operation of the main conveyor, but may be stopped while cars are being changed, the main conveyor in the meantime continuing to deliver into hopper 186. By means of the hydraulic jacks 189 and 190, the elevation of the rear end of the delivery conveyor may be changed as desired either when the conveyor is operating or is at rest. The delivery conveyor may also be swung relative to the main conveyor about its vertical pivoting axis under all conditions of conveyor operation. The following means are provided for effecting the latter adjustment of the delivery conveyor:

Referring to Figures 1, 5, 17 and 18, a cylinder 214 is mounted on frame element 2 and has slidable therein a piston 215 which is fixed to a piston rod 216, slidable in a gland 217. The outer end of piston 216 is connected to a frame 218 slidably guided between walls 219 and 220 and supporting a pair of pulleys 221 and 222. Supported on fixed axles 223 and 224 at the ends of walls 219 and 220 are two pairs of sheaves 225, 226 and 227, 228. A cable 229, Figure 5, is anchored to the frame of the delivery conveyor and carried around the casting 186 to a guide sheave 230 to and around sheave 226, thence around sheave 221, thence around sheave 225, thence around sheave 227, thence around sheave 222, thence around sheave 228 and finally around a sheave 231 to and about casting 186 to be anchored to the frame of the delivery conveyor at its side opposite to the first mentioned point of attachment. Reciprocation of piston 216 and therewith slide 218 will cause the extremities of cable 229 to be alternately tensioned and paid out, thus swinging the delivery conveyor about its vertical pivot in the desired direction.

Attached to the side plates 4 and 5 at their rear extremities, Figures 1, 3, 5, 6, 7 and 8, are lugs 232, 232', and 233, 233', which support vertical pins 234 and 235 to which are hinged plates 236 and 237, extending above the sides of hopper casting 186 substantially tangentially to the latter. A flexible web 238 is secured to the extremity of plate 236 by means of a clamp 239 and is led rearwardly around a vertical roller 240 revolubly supported by the brackets 241 and 242 mounted on the delivery conveyor supporting frame. Rearwardly of the roller, the web passes in contact with a vertical angle plate 243 and at its rear extremity is connected wtih a cable 244 by means of a clamp 245. Cable 244 is passed around a sheave 246 mounted between brackets 247 and 248 secured to the conveyor supporting frame, thence forwardly around sheaves 249, 250 mounted on a frame cross member 251, and thence rearwardly to a sheave 252 mounted in a block 253. From sheave 252, the cable is passed around sheaves 254 and 255, rearwardly about a sheave 256 similar to sheave 246 and thence forwardly to be secured by means of a clamp 257 to the rear end of a web 258 which is secured to the end of plate 237 by means of a clamp 259. A guide roller 260 and a guide plate 261 similar to roller and plate 240 and 243 are engaged by web 258 in the manner already described with reference to web 238.

A pair of parallel bolts 262 and 263 secured to block 253 have their ends connected by means of a yoke 264 through which projects a bolt 265 anchored in a frame cross member 266. The forward end of bolt 265 is passed through a yoke 266 slidable on bolts 262 and 263, and a compression spring 267 is interposed between yokes 264 and 266, the force of this spring being adjustable through adjustment of yoke retaining nuts 262', 263' and 265'.

It will be evident that sheave 252 being under the influence of spring 267 will tend to tension cable 244 and therewith webs 238 and 258. Upon swinging of the delivery conveyor, the webs and cable will cooperate with the various guide elements so that each web will always be maintained in a taut condition, and hence in proper material guiding relation to the overlapping ends of conveyors B and D. The main guide elements 240, 243, and 260, 261 move in constant arcs, having the vertically pivoting axes of the conveyor as their center.

For supplying pressure to the various hydraulic jacks, which have been described, a pump mechanism 268 which draws from a reservoir or tank, not shown, is mounted on the main frame casting 3 and is connected to the motor 7 through a pinion 269 meshing with bevel gear 9, the pinion being fixed on a shaft on which is also fixed a pinion 270 meshing with a spur gear 271 fixed on the shaft of the pump mechanism.

A valve control mechanism designated as an entirety at 272, Figures 1 and 3, is shown in detail in Figures 23 to 27. The valve mechanism comprises a base 273 on which is mounted a block 274 provided with a plurality of bores 275, 276, 277 and 278 in which are disposed valve plugs 279, 280, 281 and 282.

An inlet port 283 communicates with bore 275 and a through passage to an outlet port 284 is provided through bores 285, 286, 287 and 288. Substantially oppositely disposed bores 289 and 290 connect bore 275 with supply pipes 291 and 292 and similar bores 293 and 294 connect bore 276 with supply lines 295 and 296, a shut-off valve 297 being provided in the latter.

A bore 298 connects bore 277 with supply pipe 299 and bores 300 and 301 connect bore 278 with supply lines 302 and 303. Base 273 is provided with drain pockets beneath plugs 279, 280 and 281 which lead to a sump 304.

Plugs 279 and 280 may be of identical form and as here shown are provided respectively with forwardly flared through passages 305 and 306, and with longitudinal grooves 307, 308 and 309, 310. Plug 281 is provided with an angular recess 311 and with a longitudinal groove 312.

Plug 282 differs from the remaining plugs in that it is not only revoluble, but is vertically displaceable in bore 278. In its lowermost position, a forwardly flared through passage 313 therein is in the plane of passages 287 and 288, so as to connect the two as shown in Figure 25 and when in this position lateral recesses 314 and 315 overlie bores 300 and 301 so that the latter are in communication with outlet 284 over the top of wall 316. Recesses 314 and 315 have downward extensions in the form of grooves 314' and 315' which, as here shown, extend to the bottom of plug 282. In an intermediate axially displaced position of plug 282, an angular recess 317 therein is adapted to connect passage 287 with bores 300 and 301, Figure 27. In the uppermost position of plug 282, a through passage 318 therein, Figure 26, connects passages 287 and 288, imperforate walls of the plug overlying and blocking bores 300 and 301.

The stem of plug 279 which is passed through suitable packing means is provided with an operating handle 319 having a limited oscillatory movement between abutments 320 and 321, Figure 22. The stem of plug 280 is provided with an operating handle 322 having integral with its attachment boss, a rectangularly extending arm 323 whose oscillatory movements are limited by abutments 324 and 325. The control handle 326 for plug 281 is similarly provided with an arm 327 whose movements are limited by abutments 328 and 329.

A bracket 330 fixed to the valve body 274 has an angular portion 331 overlying bore 278 and provided with a coaxial aperture through which the stem 282' of plug 282 passes. A flanged pivot member 332 is secured to the outer face of support 331 with its flanges overlying the margins of a recess formed in a plate 333, the latter thus being adapted for rotary movement about stem 282' as an axis, but being restrained against axial displacement relative to the stem. The upper end of stem 282' is secured to a block 334 pivoted between the bifurcated ends 335 and 336 of a lever 337, the forward ends of arms 335 and 336 being provided with a longitudinally extending slot 338, Figure 24, in which is engaged a pin 339 supported between stanchions 340 and 341 fixed on plate 333. Movement of lever 337 in horizontal planes thus acts to rotate plug 282, while movement of the lever in vertical planes causes it to pivot about pin 339 to reciprocate plug 282 and selectively bring passage 313, recess 317 or passage 318 thereof into register with passage 287 of the valve body. Pivot member 332 is provided with shoulders 342 and 343 adapted to cooperate with shoulders 344 and 345 of plate 333 to limit the swinging movement of lever 337 in horizontal planes.

Referring to Figure 28, pump mechanism 268 has its delivery port in connection with inlet 283 of the valve body by means of a pipe 346, the outlet of the valve body being in connection with the pump mechanism by means of a return line 347. Sump 304 is in connection with the fluid reservoir by means of a return line 348. Pipe 291 leads to one end of cylinder 214 while pipe 292 leads to the other end of the cylinder. Pipe 295 leads through a branch line 349 to the lower ends of cylinders 119 and 120, while pipe 296 through shut-off valve 297, an escape valve 350 and a branch line 351, leads to the upper ends of cylinders 119 and 120. Pipe 302 leads to the lower end of cylinder 43 associated with planetary gearing 15, while a bleeder pipe 352 leads from this cylinder back to the reservoir. Pipe 303 is in connection with the lower end of cylinder 43 associated with planetary gearing 16 and a bleeder pipe 353 leads from this cylinder back to the reservoir.

With the parts of the valve mechanism in the position shown in Figures 24 and 25, the hydraulic medium will merely be circulated through the valve block, entering through line 346 and returning through line 347. If, now, handle 319 be moved in a clockwise direction, inlet 283 will be placed in connection with bore 289, groove 308 will be placed in connection with bore 290, and the rear end of passage 305 will be blocked by an imperforate wall portion of bore 275. Under these circumstances, fluid will pass through line 291 to the forward end of cylinder 214 moving piston 215 rearwardly and thus swinging the delivery conveyor D. The fluid to the rear of the piston will be exhausted through line 292, bore 290 and groove 308 to sump 304, whence it will return through line 348 to the reservoir. It will be obvious that movement of lever 319 in a counter-clockwise direction will cause a reverse supply and exhaust of the fluid as regards cylinder 214.

Similarly, upon rotation of plug 280 in a clockwise direction (handle 319 having been returned to its central position) fluid will be supplied through lines 295 and 349 to the lower ends of cylinders 119 and 120 to elevate the gathering end of the main conveyor, fluid being exhausted from the upper ends of the cylinders through lines 351 and 296.

Under some circumstances, the gathering end of the conveyor will be sufficiently heavy so it will not tend to climb the material and thus may be entirely controlled by the supply of fluid to and its exhaust from the lower ends only of cylinders 119 and 120. Under these circumstances, lines 296 and 351 may be drained, valve 297 closed, and valve 350 opened so that pressures developed in the upper ends of cylinders 119 and 120 will be relieved. Under these conditions, when line 295 is being drained through groove 309 of plug 280, through passage 306 will be blocked due to the fact that its rear end will be closed by an imperforate wall of bore 276. Since thus there will be no escape for the fluid supplied by the pump mechanism, the latter is provided with a relief valve in the well-known manner.

Upon rotation of plug 281 in clockwise direction the fluid supply will be connected through line 299 and branch line 354 to the lower end of cylinders 189 and 190 to elevate the rear end of the delivery conveyor, which lowers by gravity when the plug is turned in a counter-clockwise direction to bring groove 312 in register with bore 298. It will be evident that if desired, this plug and bore combination may be substituted in the position of bore 276 and plug 280 if it is desired to do away with the connection to the upper ends of cylinders 119 and 120.

Referring to Figure 6, it will be noted that line 299 is in connection with line 354 through a swivel connection adapted to swivel on an axis coincident with the vertical pivoting axis of the delivery conveyor.

With plug 282 in the position shown in Figures 24 and 25, the hydraulic medium is passing freely through passage 313 and lines 302 and 303 are draining through recesses 314 and 315. Upon a clockwise rotation of plug 282, the pressure fluid is admitted to line 302 to tension to the desired extent the control bands of planetary gearing 15 through the movement of piston 42 in cylinder 43. Rotation of the plug in a counter-clockwise direction connects the fluid supply to cylinder 43 associated with planetary gearing 16. If plug 282 is lifted to the intermediate position shown in Figure 27, fluid is supplied to both of cylinders 43. When the plug is in its upper limit position, shown in Figure 26, the fluid supply freely traverses the plug through passage 318 while the side walls of the plug block bores 300 and 301 and lock the fluid in lines 302 and 303, thus retaining the planetary bands in their adjusted position.

In the position of plug 282 shown in Figure 27, pressure is supplied to both of lines 302 and 303 so that the transmission bands are simultaneously operated. By turning the plug in either direction, one or the other of grooves 314' and 315' is brought over port 300 or 301 so that fluid escape from one of the lines is permitted through the groove while pressure is maintained in the other line. With the plug in the position shown in Figure 26 both ports 300 and 301 are completely blocked. However, if the plug is rotated in one direction or the other one of the ports may be maintained blocked and one or the other of grooves 314' and 315' brought into communication with the other port so that fluid escape through the latter is permitted.

With plug 282 in the position shown in Figure 25 it may be turned for example in counterclockwise direction a certain angular extent, while still maintaining exhaust through groove or recess 314. If the plug is now lifted to the position of Figure 27, the plug body will still cover port 300, whereas port 301 is in communication with passage 287. This operation may be reversed for sole supply through port 300. In this manner the plug may be moved directly to its intermediate position from its lower position to supply pressure directly to one or the other of the jacks without passing through an intermediate position wherein pressure is supplied to both of the jacks as would be the case if the plug were lifted prior to its being turned.

It will be evident that the described machine is of considerable adaptability and while it is of relatively great capacity, its control is unusually simplified through the provision of the hydraulic control system, just described.

Obviously those skilled in the art may make various changes in the details and arrangement of parts without departing from the spirit and scope of the invention as defined by the claims hereto appended, and I wish therefore not to be restricted to the precise construction herein disclosed.

Having thus described and shown an embodi- ment of my invention, what I desire to secure by Letters Patent of the United States is:

1. Material handling mechanism comprising a pair of elongated laterally spaced box-like elements, supporting and tractive members housed in said elements, a substantially horizontal frame interconnecting said elements below their upper extremities, a motor mounted on said frame, driving connections between the motor and tractive members supported on said frame, an elongated substantially horizontal conveyor extending above said motor and connections and including a trough between the upper extremities of said box-like elements for lateral support thereby, the rear end of said conveyor being pivotally connected to the rear ends of said elements on a transverse axis, said conveyor having a forward horizontally pivoted end projecting beyond said elements, and hydraulically actuated means for swinging said end relative to the remaining portion of the conveyor or for moving the conveyor as a whole about said axis.

2. Material handling mechanism comprising a chassis including traction devices supporting the same, means for driving the traction devices to move the chassis forward or backward, said means comprising a rotary drive member rotatable in either direction, a conveyor mounted on said chassis and including a head shaft, a conveyor drive element concentric with said shaft and freely rotatable relative thereto, means connecting said rotary drive member and conveyor drive element whereby the latter is rotated in dependence upon the direction of rotation of the former, a double acting pawl and ratchet transmission mechanism between said conveyor drive element and head shaft, said mechanism having a neutral position, and manually operable setting means for said mechanism.

3. Material handling mechanism comprising a gathering conveyor, means to move the receiving end of the conveyor into material to be gathered to engage said end directly in the material to be gathered, a shovel carried by the conveyor laterally of its receiving end, and a guide member oblique to the longitudinal axis of the conveyor for guiding material from the shovel to the conveyor.

4. Material handling mechanism comprising a gathering conveyor, means to move the receiving end of the conveyor to engage it in a mass of material to engage said end directly in the material to be gathered, a shovel carried by the conveyor laterally of its receiving end, said shovel having a forward portion pivotal on a horizontal axis transverse to the conveyor, and a guide member oblique to the longitudinal axis of the conveyor for guiding material from the shovel to the conveyor.

5. Material handling mechanism comprising a gathering conveyor, means to move the conveyor to engage its receiving end in a mass of material to engage said end directly in the material to be gathered, a shovel carried by the conveyor laterally of its receiving end, said shovel having a forward portion pivotal on a horizontal axis transverse to the conveyor and a rear fixed portion, a vertical side wall on said fixed portion oblique to the longitudinal axis of the conveyor for guiding material from the shovel to the conveyor, and a vertical side wall on said forward portion in overlapping relation to said first named vertical side wall.

6. Material handling mechanism comprising a gathering conveyor including a trough and material engaging means traversible therealong, means to move the receiving end of the conveyor into material to be gathered to engage the material engaging means directly in the material, scoop means carried by the conveyor laterally of its receiving end, said scoop means having a forward horizontal edge projecting laterally of the trough at the lower forward edge of the latter, the scoop means being inclined upwardly from said forward horizontal edge to the top edge of the adjacent lateral wall of the trough, and a guide member oblique to the longitudinal axis of the conveyor for guiding material from the scoop means into the trough.

7. Material handling mechanism comprising a chassis including traction devices supporting the same, a conveyor extending longitudinally of the chassis and having a portion overlying and supported by the chassis in normally substantially horizontal position, the rear end of said horizontal portion being in pivotal engagement with the chassis on a transverse axis and being swingable upwardly about said axis from the normal horizontal position of said horizontal portion, the conveyor including a forward portion articulated on a transverse axis and adapted to assume an inclined position in advance of the chassis so that its forward end may rest on the surface on which the chassis is supported in advance of the latter, means for swinging said forward portion upwardly relative to said horizontal portion in substantial alignment and without affecting the normal horizontal position of the latter, and means for causing said horizontal portion to participate in the upward swinging movement of said forward portion after the position of substantial alignment has been reached whereby the conveyor as a whole is swung about the first mentioned axis by said swinging means.

8. Material handling mechanism comprising a chassis including traction devices supporting the same, a conveyor extending longitudinally of the chassis and having a portion overlying and supported by the chassis in normally substantially horizontal position, the rear end of said horizontal portion being in pivotal engagement with the chassis on a transverse axis and being swingable upwardly about said axis from the normal horizontal position of said horizontal portion, the conveyor including a forward portion articulated on a transverse axis and adapted to assume an inclined position in advance of the chassis so that its forward end may rest on the surface on which the chassis is supported in advance of the latter, means for swinging said forward portion upwardly relative to said horizontal portion in substantial alignment and without affecting the normal horizontal position of the latter, and means for causing said horizontal portion to participate in the upward swinging movement of said forward portion after the position of substantial alignment has been reached whereby the conveyor as a whole is swung about the first mentioned axis by said swinging means, said swinging means comprising expansible and contractible means connectible between said forward portion and chassis below said forward portion, there being selectable connection points for said expansible and contractible means whereby the thrust effect of the latter may be varied.

NILS D. LEVIN.